US012621822B2

(12) United States Patent
Ozozlu et al.

(10) Patent No.: US 12,621,822 B2
(45) Date of Patent: May 5, 2026

(54) MULTIPLE USER MULTIPLE INPUT MULTIPLE OUTPUT SCHEDULER FOR FIXED WIRELESS ACCESS

(71) Applicant: T-MOBILE INNOVATIONS LLC, Overland Park, KS (US)

(72) Inventors: Akin Ozozlu, McLean, VA (US); Nagi A. Mansour, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 593 days.

(21) Appl. No.: 18/139,036

(22) Filed: Apr. 25, 2023

(65) Prior Publication Data
US 2024/0365307 A1     Oct. 31, 2024

(51) Int. Cl.
| | |
|---|---|
| *H04W 72/121* | (2023.01) |
| *H04B 7/0452* | (2017.01) |
| *H04W 24/02* | (2009.01) |
| *H04W 72/542* | (2023.01) |

(52) U.S. Cl.
CPC ........ *H04W 72/121* (2013.01); *H04B 7/0452* (2013.01); *H04W 24/02* (2013.01); *H04W 72/542* (2023.01)

(58) Field of Classification Search
CPC . H04W 72/121; H04W 72/542; H04W 24/02; H04B 7/0452
See application file for complete search history.

(56) References Cited

FOREIGN PATENT DOCUMENTS

WO      WO-2019086928 A1 *   5/2019   ............ H04W 72/54

* cited by examiner

*Primary Examiner* — Gbemileke J Onamuti
(74) *Attorney, Agent, or Firm* — Shook Hardy & Bacon L.L.P.

(57) ABSTRACT

Methods and systems for implementing MU-MIMO scheduling in a network are provided. The method begins with determining at least one signal condition metric for a plurality of signals used for communication between a base station and a plurality of devices. A machine learning model is trained to determine whether a device is a mobile device or a fixed wireless device using training data. The training data comprises at least one signal condition metric for the plurality of signals. Users may connect to the network by a mobile connection or through a fixed connection. An output of the machine learning model is then used to predict a type of connection to the network for each device of the plurality of devices. Then, based on the type of connection, MU-MIMO pairings are assigned to at least a portion of the plurality of devices.

20 Claims, 5 Drawing Sheets

300

400

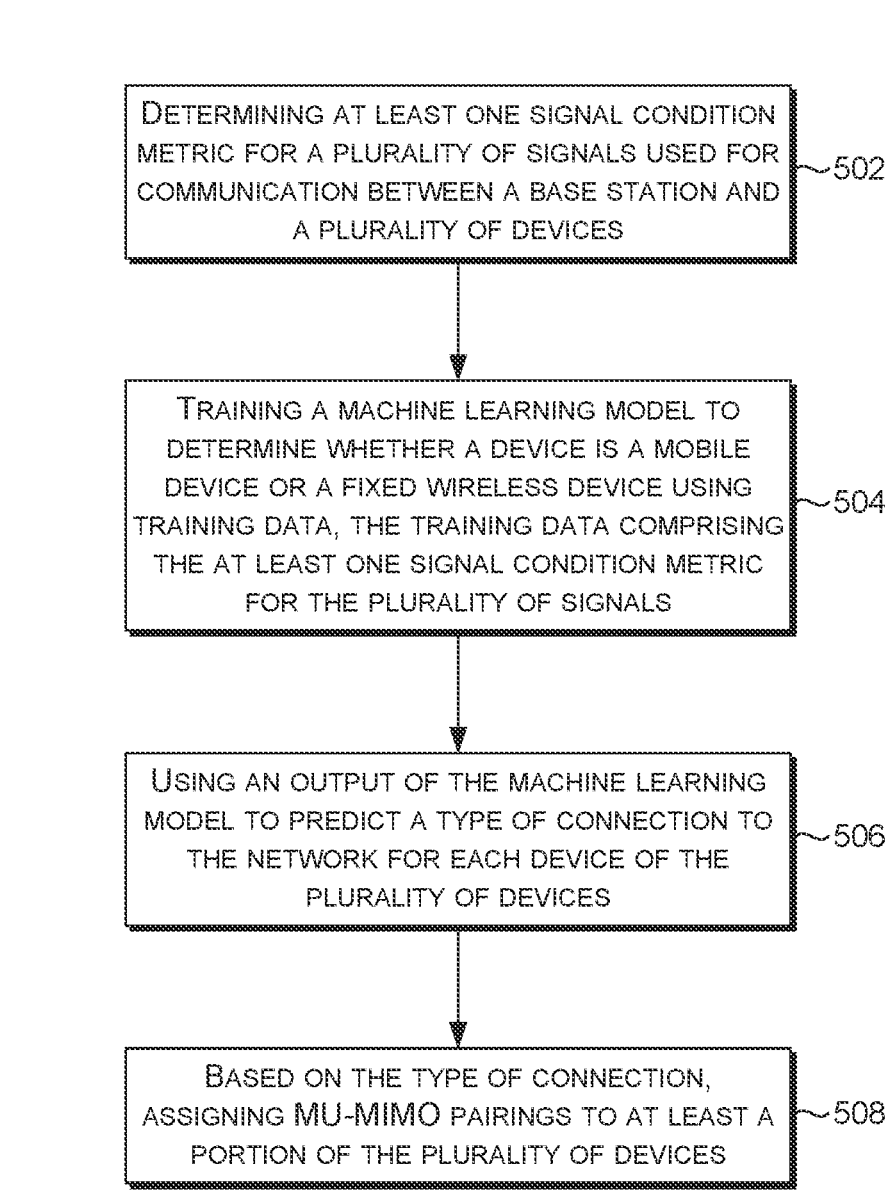

500

DETERMINING AT LEAST ONE SIGNAL CONDITION METRIC FOR A PLURALITY OF SIGNALS USED FOR COMMUNICATION BETWEEN A BASE STATION AND A PLURALITY OF DEVICES — 502

TRAINING A MACHINE LEARNING MODEL TO DETERMINE WHETHER A DEVICE IS A MOBILE DEVICE OR A FIXED WIRELESS DEVICE USING TRAINING DATA, THE TRAINING DATA COMPRISING THE AT LEAST ONE SIGNAL CONDITION METRIC FOR THE PLURALITY OF SIGNALS — 504

USING AN OUTPUT OF THE MACHINE LEARNING MODEL TO PREDICT A TYPE OF CONNECTION TO THE NETWORK FOR EACH DEVICE OF THE PLURALITY OF DEVICES — 506

BASED ON THE TYPE OF CONNECTION, ASSIGNING MU-MIMO PAIRINGS TO AT LEAST A PORTION OF THE PLURALITY OF DEVICES — 508

FIG. 5

MULTIPLE USER MULTIPLE INPUT MULTIPLE OUTPUT SCHEDULER FOR FIXED WIRELESS ACCESS

BACKGROUND

Multiple user, multiple input, multiple output (MU-MIMO) allows a router to communicate with multiple devices simultaneously. This decreases the amount of time each device has to wait for a signal, thus speeding up the network. When multiple users begin accessing the router at the same time, congestion may arise as the router handles the request from the first device, while other devices wait. These wait times add up as more devices and their users request resources from the network. MU-MIMO allows multiple users to access router functions without congestion and provides increased speeds, up to 10 gigabit, in some use cases. Time division duplex (TDD) systems may user MU-MIMO pairing to reuse frequency and time resources between users in the same cell. Currently, the base station schedules mobile and fixed wireless users with the same or similar MU-MIMO parameters. The current scheduling does not separate mobile users from fixed wireless users, despite differences between use in mobile users and fixed wireless users, resulting in less than optimal use of network resources and capacity.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for implementing MU-MIMO scheduling in a network are provided. The method begins with determining at least one signal condition metric for a plurality of signals used for communication between a base station and a plurality of devices. Next, a machine learning model is trained to determine whether a device is a mobile device or a fixed wireless device using training data. The training data comprises at least one signal condition metric for the plurality of signals.

Users may connect to the network by a mobile connection or through a fixed connection. The fixed connection may use customer premises equipment or may be a fixed wireless connection. An output of the machine learning model is then used to predict a type of connection to the network for each device of the plurality of devices. Then, based on the type of connection, MU-MIMO pairings are assigned to at least a portion of the plurality of devices. This pairings may allow for scheduling the fixed users more aggressively and mobile users less aggressively, providing better resource utilization of resources.

BRIEF DESCRIPTION OF THE SEVERAL VIEWS OF THE DRAWINGS

Implementations of the present disclosure are described in detail below with reference to the attached drawing figures, wherein:

FIG. 5 depicts a flow diagram of an exemplary method for MU-MIMO scheduling in a network, in accordance with aspects herein.

DETAILED DESCRIPTION

Figure 1:
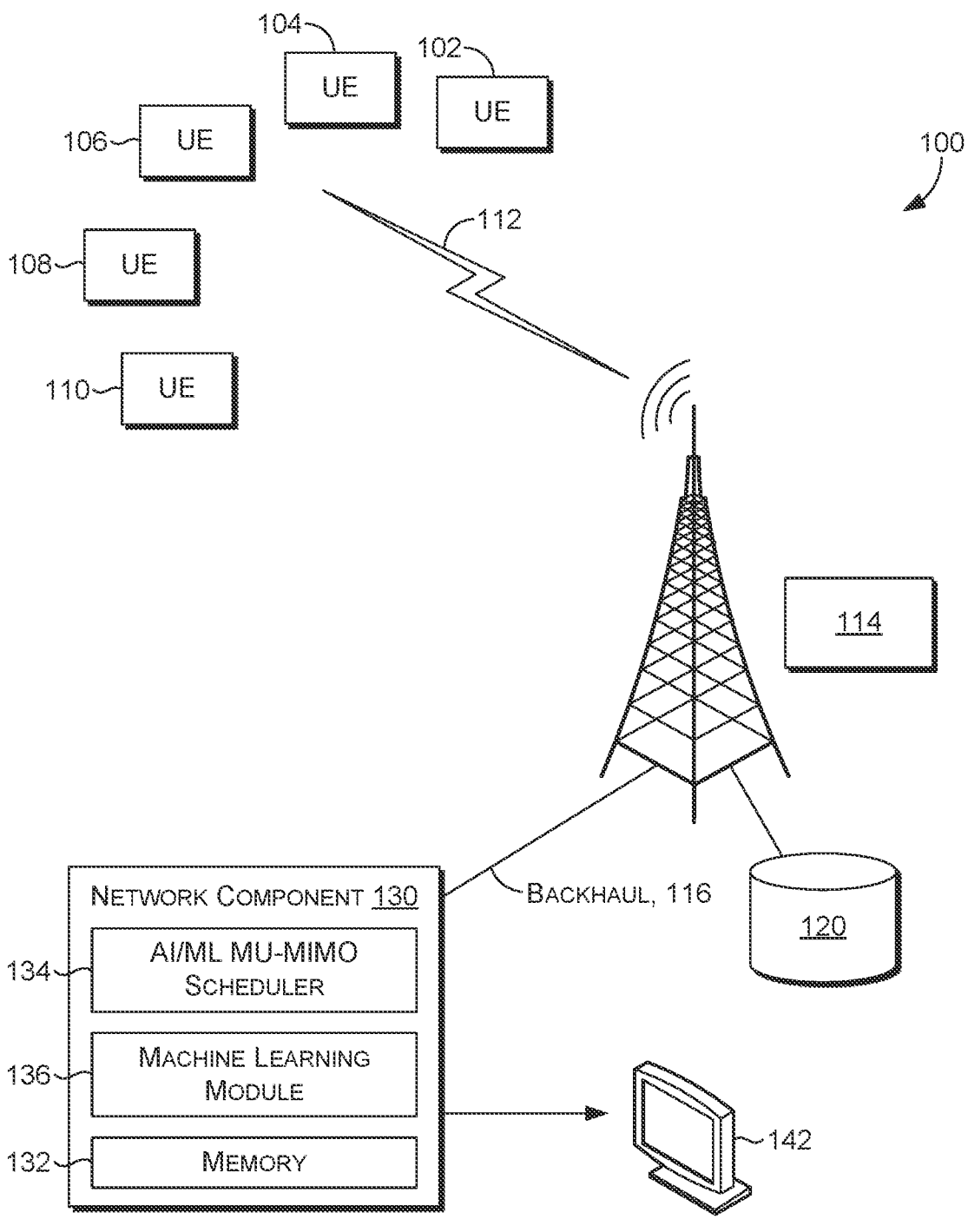
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant PDSCH Physical Downlink Shared Channel PHICH Physical Hybrid ARQ Indicator Channel PUCCH Physical Uplink Control Channel PUSCH Physical Uplink Shared Channel RAM Random Access Memory RET Remote Electrical Tilt RF Radio-Frequency RFI Radio-Frequency Interference R/N Relay Node RNR Reverse Noise Rise ROM Read Only Memory RSRP Reference Signal Receive Power RSRQ Reference Signal Receive Quality RSSI Received Signal Strength Indicator SINR Transmission-to-Interference-Plus-Noise Ratio SNR Transmission-to-noise ratio SON Self-Organizing Networks TDMA Time Division Multiple Access TXRU Transceiver (or Transceiver Unit)

UE User Equipment

UMTS Universal Mobile Telecommunications Systems

WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR), reference signal received quality (RSRQ), and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

A first aspect of the present disclosure provides a method of MU-MIMO scheduling in a network. The method begins with determining at least one signal condition metric for a plurality of signals used for communication between a base station and a plurality of devices. A machine learning model is then trained to determine whether a device is a mobile device or a fixed wireless device using training data. The training data may comprise at least one signal condition metric for the plurality of signals. An output of the machine learning model is then used to predict a type of connection to the network for each device of the plurality of devices. Based on the type of connection determined, MU-MIMO pairings may be assigned to at least a portion of the plurality of devices.

A second aspect of the present disclosure provides a system for MU-MIMO scheduling in a network. The system comprises a base station having one or more antennas for receiving a plurality of signals used for communication between the base station and a plurality of devices. The system also includes a machine learning module configured to communicate with the base station. The machine learning module may be trained to determine whether a device is a mobile device or a fixed wireless device using training data that may comprise at least one signal condition metric for the plurality of signals. In addition, the system may also comprise a scheduler configured to communicate with the machine learning module and the base station, the scheduler using an output of the machine learning module to predict a type of connection to the network for the plurality of devices. The scheduler may then assign MU-MIMO pairings to at least a portion of the plurality of devices.

Another aspect of the present disclosure is directed to a non-transitory computer storage media storing computer-usable instructions that cause the processors to determine at least one signal condition metric for a plurality of devices. The instructions may also train a machine learning model to determine whether a device is a mobile device or a fixed wireless device using training data. The training data may comprise the at least one signal condition metric for the plurality of signals. The instructions may then use an output of the machine learning model to predict a type of connection to the network for each device of the plurality of devices and then assign MU-MIMO pairings to at least a portion of the plurality of devices, based on the type of connection.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, base station 114 (which may be a cell site, base station, or the like), and one or more communication channels 112. The communication channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 600) that communicates via wireless communications with the base station 114 in order to interact with a public or private network.

Figure 6:
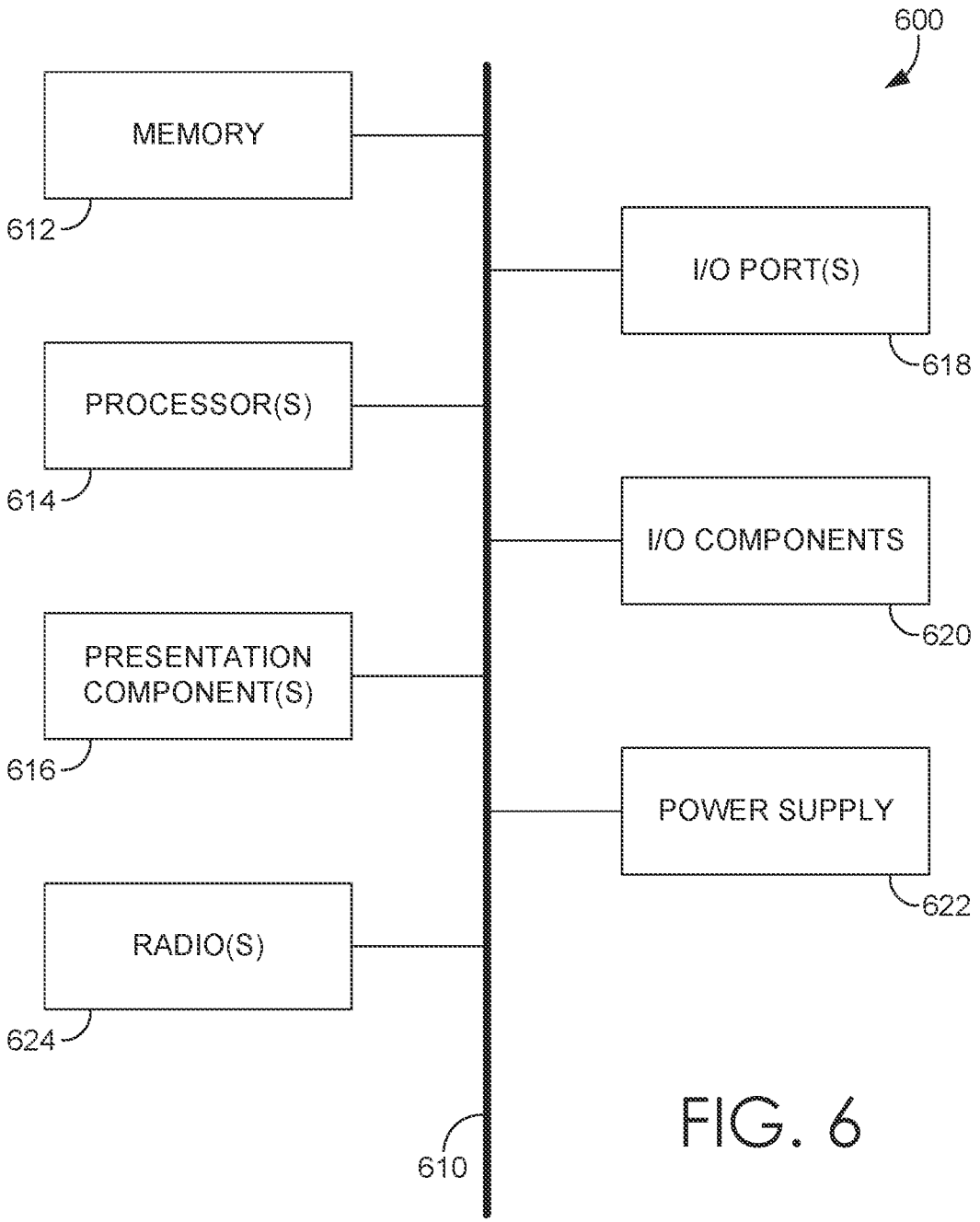
FIG. 6 depicts an exemplary computing device suitable for use in implementations of the present disclosure, in accordance with aspects herein.

In some aspects, each of the UEs 102, 104, 106, 108, and 110 may correspond to computing device 600 in FIG. 6. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 to communicate with other computing devices (e.g., a mobile device(s), a server (s), a personal computer(s), etc.) through base station 114.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. Network environment 100 may comprise equipment placed in network operator facilities, but may also comprise equipment located at a customer's premises, known as customer premises equipment (CPE).

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network. The telecommunication network may also provide services using MU-MIMO techniques.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the base station 114. Base station 114 may store the signal information and data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, an artificial intelligence (AI)/machine learning (ML) AI/ML MU-MIMO scheduler 134, and a machine learning module 136. All determinations, calculations, and data further generated by the AI/ML MU-MIMO scheduler and machine learning module 136 may be stored at the memory 132 and also at the data store 140. Although the network component 130 is shown as a single component comprising the memory 132, AI/ML MU-MIMO scheduler 134, machine learning module 136, and the data store 140, it is also contemplated that each of the memory 132, the AI/ML MU-MIMO scheduler 134, and machine learning module 136 may reside at different locations, be its own separate entity, and the like, within the home network carrier system.

The network component 130 is configured to retrieve signal quality metrics and carrier loading metrics from the base station 114 or one of the UEs, 102, 104, 106, 108, and 110. Signal quality metrics can include any one or more of multiple metrics, such as signal-to-interference and noise (SINR), reference signal received power (RSRP), and reference signal received quality (RSRQ). The network component 130 can also track uplink and downlink user traffic. The AI/ML MU-MIMO scheduler 134 can observe data usage over the network using measurement metrics such as SINR, RSRP, and RSRQ. The machine learning module 136 is in communication with the AI/ML MU-MIMO scheduler 134 and may incorporate artificial intelligence to identify users of a fixed wireless access system and mobile communication system users. The AI/ML MU-MIMO scheduler 134 and machine learning module 136 may each be located in a central office or other centralized location. For a distributed radio access network, the AI/ML MU-MIMO scheduler 134 can be located at the base station 114. The base station 114 may be a gNodeB that interfaces with the AI/ML MU-MIMO scheduler 134. The AI/ML MU-MIMO scheduler 134, acting in conjunction with the machine learning module 136 may then determine what UEs are accessing the network and whether that access is mobile or through fixed wireless access.

FDD and TDD are two different spectrum usage techniques. While FDD uses separate frequencies for uplink and downlink communication, TDD uses a single frequency for both uplink and downlink, with devices transmitting a different times. TDD can be more suitable when paired spectrum resources are not available. In general, FDD can provide better coverage, while TDD can provide better capacity. MU-MIMO may be used in conjunction with TDD systems to re-use frequency and time resources between users in a cell.

MU-MIMO operates by splitting the available bandwidth into separate, individual data streams that equally share the connection. The access is through a WiFi router that may handle multiple streams 2×2, 3×3, 4×4, and 8×8. Each UE accesses the WiFi router at the same time. MU-MIMO transmits multiple data streams to multiple UEs at the same time on the same frequency resources. The AI/ML MU-MIMO scheduler 134 incorporates AI and ML that operate on a deep neural network that may be machine learning module 136. The AI/ML MU-MIMO scheduler 134 and machine learning module 136 continuously observe traffic and key performance indicators of the network. The data can include radio conditions and traffic using each base station 114. The data can include RSRP, RSRQ, SINR, angle of arrival, and similar metrics, and may also include traffic using each base station. The neural network may be a recurrent neural network.

The AI/ML MU-MIMO scheduler 134 uses a machine learning model incorporated into machine learning module 136 that may be retrained on a selected basis, such as every twenty-four hours and on-demand. Retraining may also be on-demand based on high traffic volume. A machine learning model focuses on enabling computers to perform tasks without explicit programming. A machine learning model is a file that has been trained to recognize certain types of patterns. The model may be trained over a set of data, such as signal quality metrics for mobile devices and for fixed wireless devices. The initial data may be training data. Deep learning is a subset of machine learning that is based on artificial neural networks. Training using deep learning requires high data volume, which is available in wireless communication networks in 5G and 6G ecosystems. Deep learning may use a machine learning model or a deep neural network and may use a recurrent neural network that keeps past signal measurements and selections "in mind" during the learning process and can consider those past data points and selections when reviewing current data, thus providing context. Machine learning module 136 may also incorporate deep learning.

The machine learning module that forms a part of the machine learning module 136 may be provided with an algorithm that the machine learning module uses in learning to identify patterns in the training data, and later, in the input data from network operations. The AI/M MU-MIMO scheduler 134 uses AI modeling in the creation, training and deployment of machine learning algorithms that emulate logical decision making based on the available data, such as signal condition metrics. The AI/ML MU-MIMO scheduler may be able to determine when changes in signal condition metrics warrant revising MU-MIMO pairings.

Figure 2:
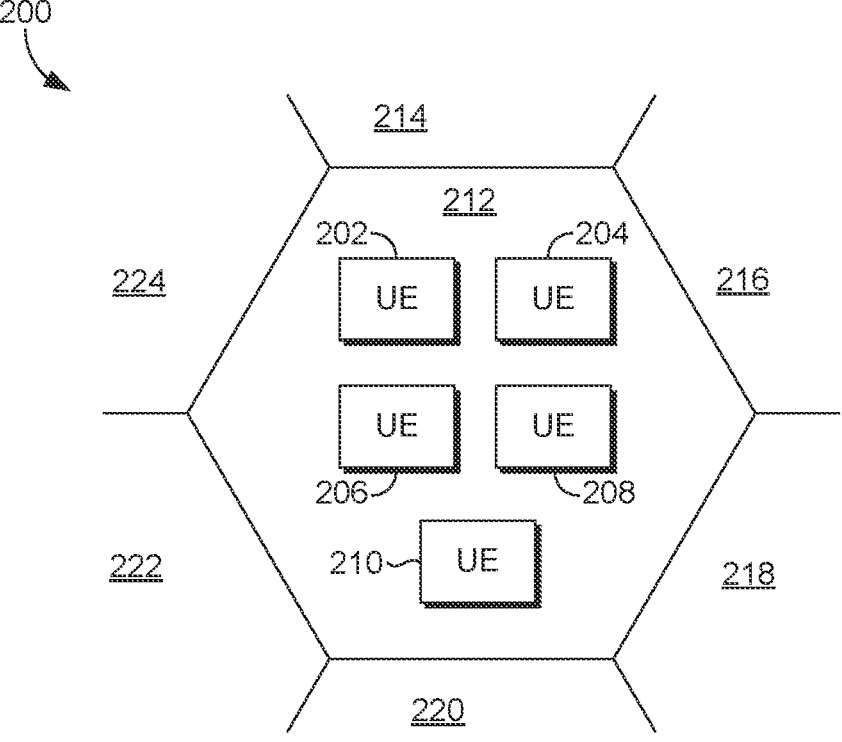
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell site 212 and can move to other cells such as adjoining cell sites 214, 216, 218, 220, 222 and 224.

Figure 3:
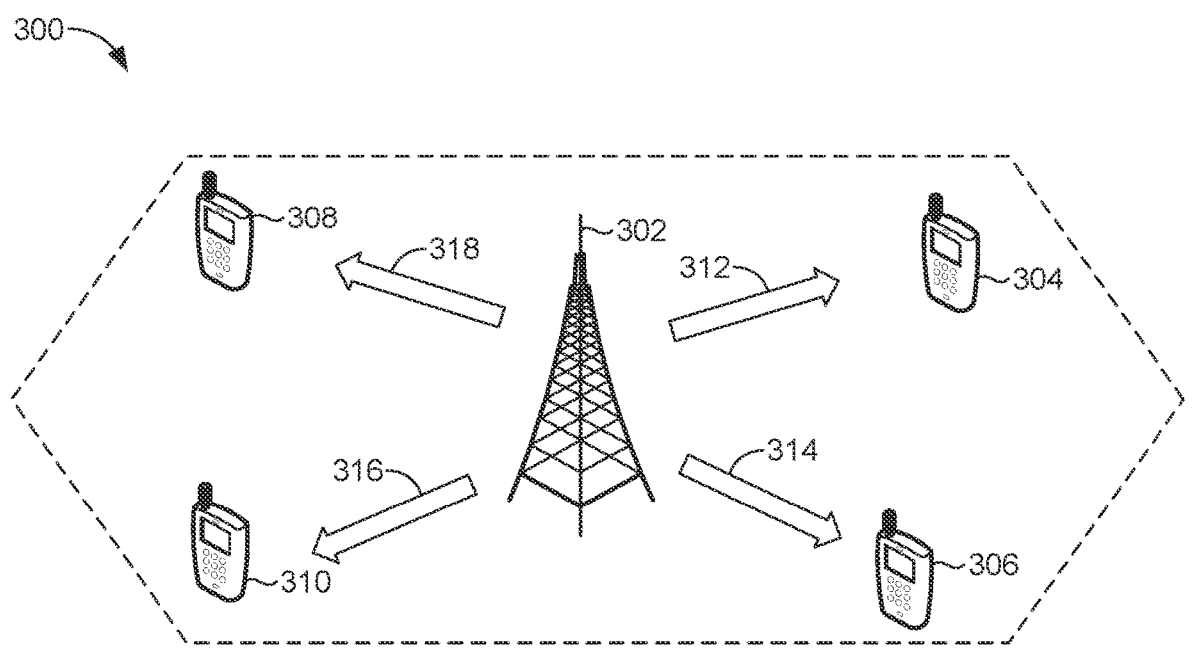
FIG. 3 depicts a cellular network incorporating MU-MIMO, in which implementations of the present disclosure may be employed, in accordance with aspects herein.

FIG. 3 depicts a cellular network incorporating MU-MIMO, in which implementations of the present disclosure may be employed, in accordance with aspects herein. The MU-MIMO network 300 includes a base station 302 which transmits signals 312, 314, 316, and 318 to UEs 304, 306,

308, 310, and 312, respectively. The UEs 304, 306, 308, 310, and 312 receive the transmitted signals 312, 314, 316, and 318 simultaneously. The transmit frequency used to transmit signals 312, 314, 316, and 318 is the same frequency.

Figure 4:
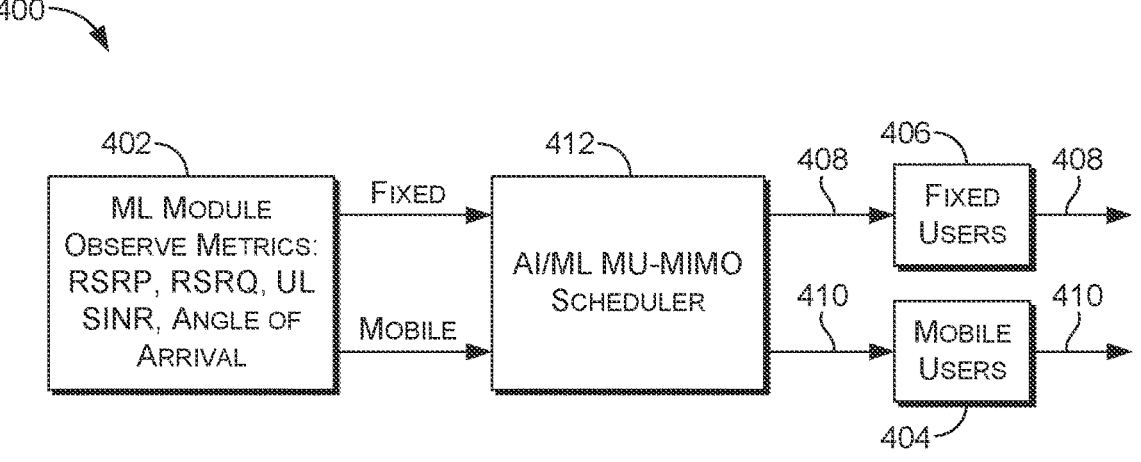
FIG. 4 depicts operation of an AI/ML MU-MIMO scheduler in accordance with aspects herein.

FIG. 4 depicts operation of an AI/ML MU-MIMO scheduler in accordance with aspects herein. The MU-MIMO environment 400 includes the machine learning (ML) module 402. The ML module 402 observes signal metrics for signals transmitted to all UEs on a single frequency. The signal metrics may include RSRP, RSRQ, uplink (UL) SINR, and angle of arrival. The RSRP fluctuations may be analyzed with respect to a mean RSRP and a standard deviation. Both the RSRQ and UL SINR are considered with respect to a mean RSRQ and UL SINR and also a standard deviation. The angle of arrival measurements may be used as a measure of angular spread.

The ML module 402 uses the signal metrics and determines which UEs are fixed wireless access users and which UE users are mobile customers. After determining the fixed wireless users the ML module 402 outputs a fixed wireless access signal 408 to the AI/ML MU-MIMO scheduler 412 then schedules the streams for both the fixed wireless access users 406 and the mobile users 404. By separating the fixed wireless access users from the mobile users the AI/ML MU-MIMO scheduler 412 may be able to more aggressively assign the MU-MIMO paired resource elements while providing less aggressive settings for mobile users.

FIG. 5 depicts a flow diagram of an exemplary method for MU-MIMO scheduling in a network, in accordance with aspects herein. The method 500 begins in block 502 with determining at least one signal condition metric for a plurality of signals used for communication between a base station and a plurality of devices. The method then continues in block 504 with training a machine learning model to determine whether a device is a mobile device or a fixed wireless device using training data. The training data may comprise the at least one signal condition metric for the plurality of signals. Next, in block 506 the method continues with using an output of the machine learning model to predict a type of connection to the network for each device of the plurality of devices. The method concludes in block 508 with assigning MU-MIMO parings to at least a portion of the plurality of devices, based on the type of connection.

The type of connection the UE has with the network may be either fixed or mobile. The fixed network connection may be made through customer premises equipment. Alternatively, the fixed network connection may use fixed wireless access equipment. The type of connection may be determine the type of connection based on a fluctuation of at least one signal metric for each UE of the plurality of UEs. The signal condition metric may be at least one of RSRP, RSRQ, and angle of arrival. The fluctuations in the signal condition metric may be determined relative to at least one signal condition metric measured with respect to the signal metric of the signal. After the type of network connection has been determined the scheduling of the downlink signal schedules the signal using a same frequency for all of the UEs of the plurality of UEs.

FIG. 6 depicts an exemplary computing device suitable for use in implementations of the present disclosure, in accordance with aspects herein. With continued reference to FIG. 6, computing device 600 includes bus 610 that directly or indirectly couples the following devices: memory 612, one or more processors 614, one or more presentation components 616, input/output (I/O) ports 618, I/O components 620, radio(s) 624, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof.

Exemplary memory includes solid-state memory, hard drives, optical-disc drives, etc. Computing device 600 includes one or more processors 606 that read data from various entities such as bus 610, memory 612 or I/O components 620. One or more presentation components 616 present data indications to a person or other device. Exemplary one or more presentation components 616 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc.

The radio(s) 624 represents one or more radios that facilitate communication with a wireless telecommunications network. While a single radio 624 is shown in FIG. 6, it is contemplated that there may be more than one radio 624 coupled to the bus 610. Illustrative wireless telecommunications technologies include CDMA, GPRS, TDMA, GSM, and the like. The radio 624 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of multiple user, multiple input, multiple output (MU-MIMO) scheduling in a network, the method comprising:

determining at least one signal condition metric for a plurality of signals used for communication between a base station and a plurality of devices;

training a machine learning model to determine whether each device of the plurality of devices is a mobile device or a fixed wireless device using training data, the training data comprising the at least one signal condition metric for the plurality of signals;

using an output of the machine learning model to predict a type of connection to the network for the each device of the plurality of devices; and based on the type of connection, assigning MU-MIMO pairings to at least a portion of the plurality of devices.

2. The method of claim 1, wherein a first device of the plurality of devices is determined to be a fixed wireless device.

3. The method of claim 2, wherein the fixed wireless device uses a fixed wireless access point.

4. The method of claim 2, wherein the fixed wireless device uses fixed customer premises equipment.

5. The method of claim 1, wherein a first device of the plurality of devices is determined to be a mobile device.

6. The method of claim 1, wherein the machine learning module determines a type of the plurality of devices based on a fluctuation of the at least one signal condition metric for each device of the plurality of devices.

7. The method of claim 1, wherein the at least one signal condition metric comprises at least one of a reference signal received power (RSRP), a reference signal received quality (RSRQ), or an angle of arrival.

8. The method of claim 6, wherein the machine learning module learns the fluctuation of the at least one signal condition metric relative to a mean signal metric of the at least one signal condition metric for the plurality of signals.

9. The method of claim 6, wherein the machine learning module learns the fluctuation of the at least one signal condition metric relative to a standard deviation of the at least one signal condition metric for the plurality of signals.

10. The method of claim 1, wherein each signal of the plurality of signals uses a same frequency and is sent at a same time to the plurality of devices.

11. A system for multiple user, multiple input, multiple output (MU-MIMO) scheduling, in a network, comprising:
   a base station having one or more antennas for receiving a plurality of signals used for communication between the base station and a plurality of devices;
   a machine learning module configured to communicate with the base station, wherein the machine learning module is trained to determine whether a device is a mobile device or a fixed wireless device using training data, the training data comprising at least one signal condition metric for the plurality of signals; and
   a scheduler configured to communicate with the machine learning module and the base station, the scheduler using an output of the machine learning module to predict a type of connection to the network for the plurality of devices, wherein the scheduler assigns MU-MIMO pairings to at least a portion of the plurality of devices.

12. The system of claim 11, further comprising an artificial intelligence (AI) module configured to communicate with the machine learning module and the scheduler.

13. The system of claim 11, wherein an AI module instructs the scheduler to revise a schedule of a downlink signal to the plurality of devices.

14. The system of claim 13, wherein the revision is based on a change in the at least one signal condition metric.

15. The system of claim 14, wherein the change in the at least one signal condition metric is based on tracking the at least one signal condition metric by the AI module.

16. A non-transitory computer storage media storing computer-usable instructions that, when used by one or more processors, cause the processor to:
   determine at least one signal condition metric for a plurality of signals used for communication between a base station and a plurality of devices;
   train a machine learning model to determine whether each device of the plurality of devices is a mobile device or a fixed wireless device using training data, the training data comprising the at least one signal condition metric for the plurality of signals;
   use an output of the machine learning model to predict a type of connection to the network for each device of the plurality of devices; and
   assign MU-MIMO pairings to at least a portion of the plurality of devices based on the type of connection.

17. The non-transitory computer storage media of claim 16, wherein a first device of the plurality of devices is determined to be a fixed wireless device.

18. The non-transitory computer storage media of claim 17, wherein the fixed wireless device uses fixed customer premises equipment.

19. The non-transitory computer storage media of claim 16, wherein a first device of the plurality of devices is determined to be a mobile device.

20. The non-transitory computer storage media of claim 16, wherein the machine learning module determines a type of the plurality of devices based on a fluctuation of the at least one signal condition metric for each device of the plurality of devices.

* * * * *